United States Patent [19]

Ebinuma

[11] Patent Number: 5,151,967
[45] Date of Patent: Sep. 29, 1992

[54] OPTICAL FIBER SEALING ASSEMBLY

[75] Inventor: Ryuichi Ebinuma, Machida, Japan

[73] Assignee: Canon Kabushiki Kaisha, Tokyo, Japan

[21] Appl. No.: 737,023

[22] Filed: Jul. 29, 1991

[30] Foreign Application Priority Data

Jul. 31, 1990 [JP] Japan .................. 2-201155

[51] Int. Cl.⁵ ............................. G02B 6/26
[52] U.S. Cl. ................... 385/138; 385/115; 385/137
[58] Field of Search ............ 385/66, 84, 138, 139, 385/115, 137

[56] References Cited

U.S. PATENT DOCUMENTS

| | | | |
|---|---|---|---|
| 4,214,809 | 7/1980 | Reh | 385/138 |
| 4,345,816 | 8/1982 | Nakai et al. | 385/138 |
| 4,707,065 | 11/1987 | Jenkins | 385/138 |
| 4,798,433 | 1/1989 | Irvin et al. | 385/139 |
| 4,902,091 | 2/1990 | Althaus et al. | 385/138 |
| 4,904,046 | 2/1990 | Paschke et al. | 385/138 |
| 4,957,576 | 9/1990 | Fischer et al. | 385/139 |
| 5,109,466 | 4/1992 | Seike et al. | 385/138 |

FOREIGN PATENT DOCUMENTS

| | | | |
|---|---|---|---|
| 0383511 | 8/1990 | European Pat. Off. | 358/138 X |
| 57-190916 | 11/1982 | Japan | 385/138 X |
| 57-201205 | 3/1983 | Japan | 385/138 X |
| 2111243 | 6/1983 | United Kingdom | 385/138 X |

*Primary Examiner*—Brian Healy
*Attorney, Agent, or Firm*—Fitzpatrick, Cella, Harper & Scinto

[57] ABSTRACT

A light guide with an optical fiber bundle for guiding light from an outside light source into a closed space, wherein the optical fiber bundle is fitted into a throughbore formed in a light guide fixing member. The light guide fixing member has an introduction hole formed therein and in communication with the throughbore, wherein the optical fiber bundle is covered by a covering member except for a portion which is positioned within the throughbore of the light guide fixing member and which is communicated with the introduction hole, wherein the light guide has a filling material injected into the introduction hole, and wherein the light guide fixing member is fixed to a light guide communicating bore formed in a partition wall of the closed space.

8 Claims, 4 Drawing Sheets

OPTICAL FIBER SEALING ASSEMBLY

FIELD OF THE INVENTION AND RELATED ART

This invention relates to a light guide with optical fiber means for guiding light from an outside light source into a closed space.

Use of a light guide for guiding light from an outside light source into a closed space is known.

In an X-ray exposure apparatus, there is a necessity of detecting positional deviation between a mask and a wafer and, before this operation, a prealignment operation is done wherein any positional deviation of a certain reference of a circuit pattern already printed on the wafer with respect to a certain reference of the apparatus is measured through an observation optical system.

In such an X-ray exposure apparatus, as shown in FIG. 3, a main assembly including a prealignment observation optical system 101 is accommodated in a closed casing 114 which is filled with a helium gas. The main assembly further includes a wafer stage 103 for carrying a wafer thereon and, since thermal distortion is a problem to be considered, an illumination source 119 to be used with the prealignment observation optical system 101 is disposed outside of the closed casing, in consideration of its heat generation.

The prealignment observation optical system 101 includes an objective lens 105, a quarter waveplate 106, a polarization beam splitter 107, a relay lens 108, a CCD sensor 109, a pupil imaging lens 110, a viewfield setting filter 111, a condenser lens 112 and a field lens 113. Light produced by the illumination source 119 is guided by a light guide 116 provided outside the casing and by another light guide 118 provided inside the casing, to the field lens 113 of the prealignment observation optical system 110.

The outside light guide 116 is coupled with the inside light guide 118 by coupling means 117 wherein, as shown in FIG. 4, a light guide communicating bore 128 is formed in the wall 115 of the closed casing, and a light transmissive window member 129 is fixed to the light guide communicating bore by using a window fixing member 127 and plural mounting bolts 130A and 130B. O-ring 126 is disposed between the window member 129 and the closed casing wall 115, for retaining the gas-tightness of the closed casing 114.

On one hand, as for the outside light guide 116 communicated with the illumination source 119, optical fiber means 120 constituting the outside light guide 116 is inserted into a throughbore formed in a central portion of a light guide holder 124 and it is fixed by means of light guide fixing bolts 122. The light guide holder 124 is fixed to the window fixing member 127 by means of mounting bolts 132A and 132B, and the free end of the optical fiber means 120 abuts against the window member 129.

On the other hand, as for the inside light guide 118 for guiding within the closed casing 114 the light to the prealignment observation optical system 101, optical fiber means 121 constituting the inside light guide 118 is inserted into a throughbore formed in a central portion of a light guide holder 125 and it is fixed by means of light guide fixing bolts 123. The light guide holder 125 is fixed to the light guide communicating bore 128 in the closed casing wall 115 by using mounting bolts 131A and 131B, and a free end of the optical fiber means 121 abuts, from the inside, against such portion of the window member 129 as opposed to the free end of the optical fiber means 120.

With this arrangement, the light emanating from the illumination source 119 is directed through the outside light guide 116, the inside light guide 118 and the window member 129 into the prealignment observation optical system 101 placed within the closed casing 114.

SUMMARY OF THE INVENTION

With this structure, however, there exists an optical interface at each of (i) the boundary between the outside light guide and the window member and (ii) the boundary between the window member and the inside light guide. This causes reduction in light transmissivity and in illumination efficiency.

It is accordingly an object of the present invention to provide a light guide which excludes the presence of an optical interface between the inside and outside of a closed casing and thus assures high efficiency light transmission, without damaging the gas-tightness of the closed casing.

In accordance with an aspect of the present invention, there is provided a light guide with optical fiber means, for guiding light from an outside light source into a closed space, characterized in that: the optical fiber means is fitted into a throughbore formed in a light guide fixing member; the light guide fixing member has an introduction hole formed therein and in communication with the throughbore; the optical fiber means is covered by a covering member except for a portion which is positioned within the throughbore of the light guide fixing member and which is communicated with the introduction hole, wherein the light guide has a filling material injected into the introduction hole; and the light guide fixing member is fixed to a light guide communicating bore formed in a partition wall of the closed space.

The light guide fixing member may have a flange formed integrally therewith and, through the flange, the light guide fixing member may be press contacted to and fixed to the partition wall of the closed space.

The light guide fixing member may be tightly inserted into a mounting throughbore formed in a cylindrical mounting member and the mounting member may have a flange formed at an end integrally therewith and, through the flange, the mounting member may be tightly fixed to the partition wall of the closed space.

In a light guide of the present invention, since optical fiber means is fitted into a throughbore formed in a light guide fixing member and since the light guide fixing member is tightly fixed to a light guide communicating bore formed in a partition wall of a closed casing, the gas-tightness of the closed casing can be retained and light from a light source can be directed into the closed space, without the presence of an optical interface. Further, injection of a filling material into an introduction hole of the light guide fixing member is effective for the filling material to reach a portion of the optical fiber means within the throughbore of the light guide fixing member, not covered by a covering member, such that any space within the throughbore which otherwise may be communicated with the inside or the outside of the closed casing can be filled with the filling material.

Where the light guide fixing member and a mounting member into which the light guide fixing member is inserted have a cylindrical shape, when the light guide fixing member having the optical fiber means fitted is fixed to the partition wall of the closed casing or when the mounting member is fixed to the partition wall of the closed casing, the position of the light guide fixing member with respect to a rotational direction can be adjusted easily.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Figure 1:
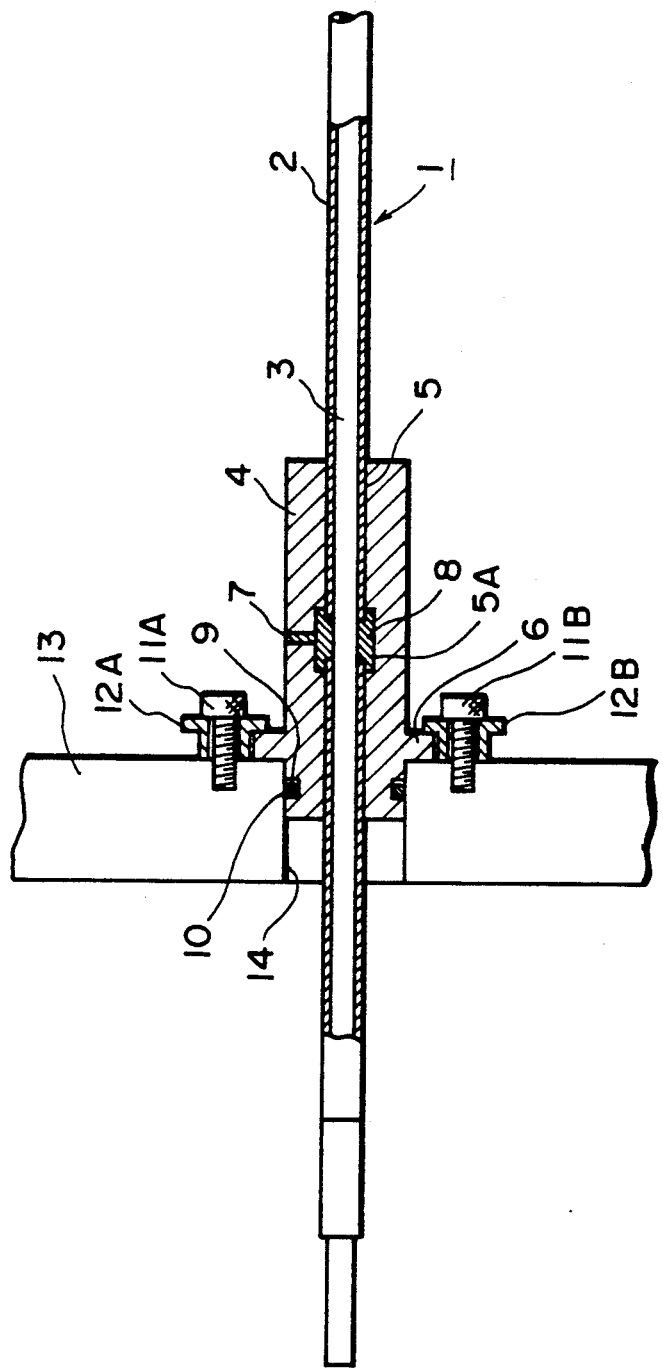
FIG. 1 is a sectional view of a light guide according to an embodiment of the present invention.

FIG. 1 is a sectional view of a light guide according to an embodiment of the present invention.

Figure 3:
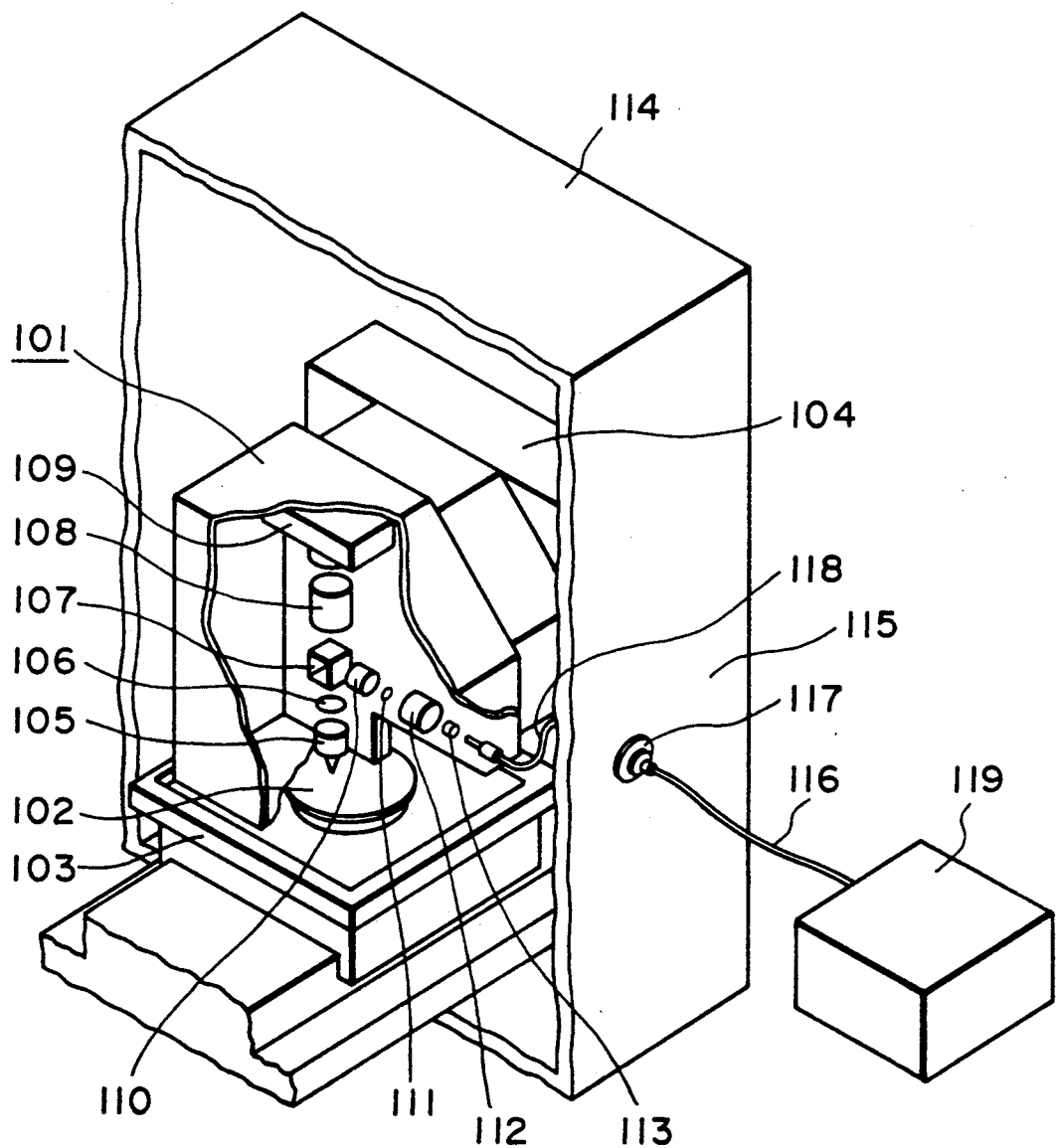
FIG. 3 is a schematic view of an X-ray exposure apparatus which includes a known type light guide.
Figure 4:
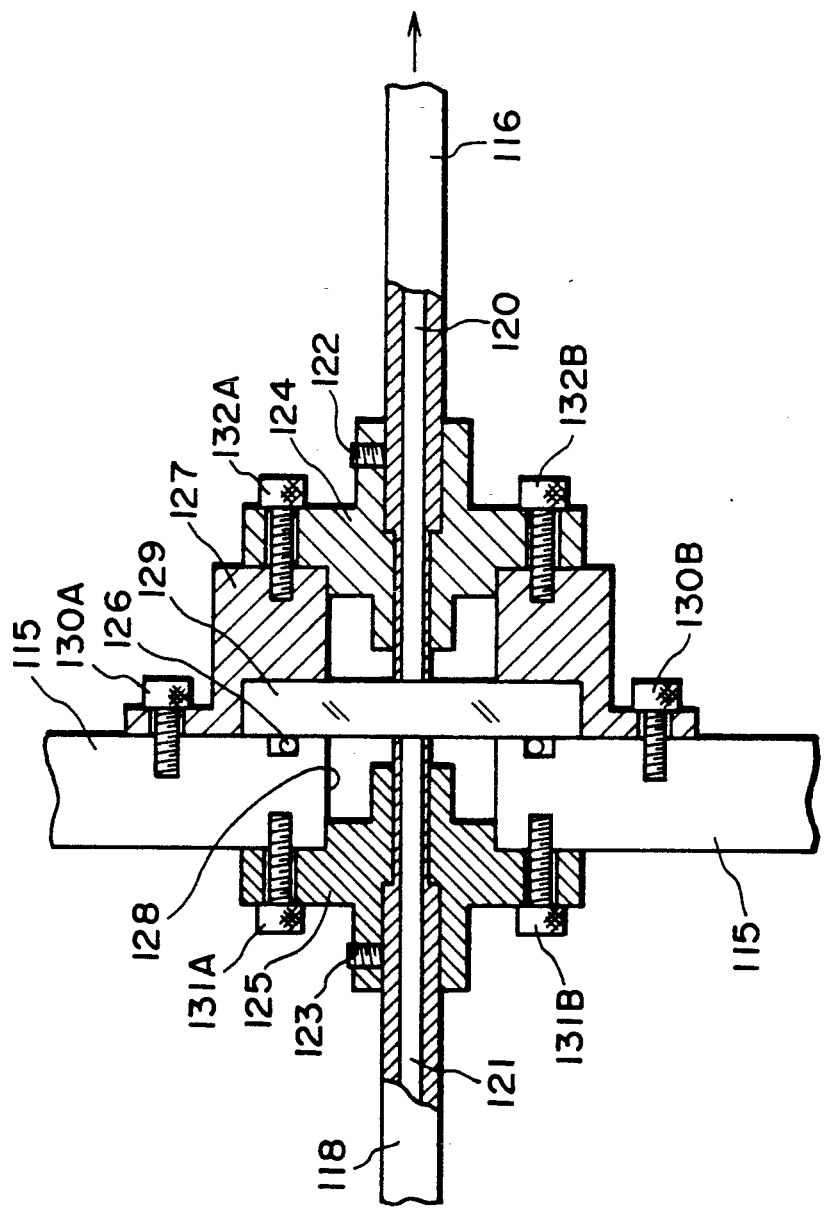
FIG. 4 is a sectional view of a known type light guide.

The light guide 1 shown in FIG. 1 is usable in an X-ray exposure apparatus such as described with reference to FIG. 3, for directing light from an illumination source outside a closed casing to a prealignment observation optical system inside the closed casing for a prealignment operation of a mask and a wafer.

The light guide 1 has an optical fiber bundle 3 which is covered by a covering member 2. The optical fiber bundle 3 is fitted into a throughbore 5 formed in a cylindrical member (light guide fixing member) 4 along its lengthwise direction. This cylindrical member 4 is fitted into and fixed to a light guide communication bore 14 which is formed in a wall 13 of the closed casing. In this manner, one end of the light guide is connected to the prealignment observation optical system and the other end is connected to the illumination source.

The cylindrical member 4 has a recess 5A formed in an inside peripheral surface of a central portion of the throughbore 5, and an introduction hole 7 communicated with the recess 5A for allowing injection therethrough of a filling material 8 (e.g. epoxy resin) having suitable flowability and viscosity into the recess 5A. Into the throughbore of the cylindrical member 4, the optical fiber bundle 3 is inserted with the portion of the covering member 2 to be positioned at the recess 5A in the throughbore 5 being peeled off. The filling material 8 is injected through the introduction hole 7 of the cylindrical member 4, such that the space of the recess 5A is filled with this filling material. Since the filling material 8 has suitable flowability and viscosity as described, it enters into interstitial clearances among the fibers of the optical fiber bundle 3, in the recess 5A of the throughbore 5, and it occupies the spaces defined by the optical fiber bundle 3 and the inside wall of the throughbore 5. The cylindrical member 4 has a flange 6 formed integrally therewith, in a portion between the introduction hole 7 and one end of the cylindrical member inserted into the light guide communication bore 14 of the closed casing wall 13. Further, it has a circumferential groove 9 formed in a portion thereof between the flange 6 and the aforementioned one end, along its circumference for receiving an O-ring 10. The cylindrical member 4 having the optical fiber bundle 3 fitted thereinto is fixed to the closed casing wall 13 as follows: That is, the O-ring is inserted into the groove 9 and then the aforementioned one end portion of the cylindrical member is gas-tightly fitted into the light guide communication bore 14 of the closed casing wall 13. After this, the circumferential edge portion of the flange 6 is pressed and secured to the wall by using mounting bolts 11A and 11B as well as mounting members 12A and 12B.

In accordance with the present embodiment, the gas-tightness of the cylindrical member 4 and the closed casing 13 can be retained by means of the O-ring 10. Also, as regards any clearance defined by the optical fiber bundle in the light guide 1, at the portion in the recess 5A of the throughbore 5 it is blocked by the filling material 8 and, thus, the gas-tightness is assured also in this portion. In this manner, no optical interface is present and the light from the light source can be introduced into the closed casing efficiently.

Additionally, the cylindrical member 4 can be mounted to the closed casing wall 13 with its rotational position being easily adjusted. Therefore, it is possible to fix the cylindrical member to the wall 13, while releasing any torsional stress to be applied to the light guide 1.

The filling material to be injected through the introduction hole 7 of the cylindrical member 4 should not be one having a property damaging the optical fibers or the covering member. Also, it should not be one having an adverse effect on the optical characteristics of the optical fibers. Further, in order to assure that it sufficiently enters into and completely occupies the clearances among the fibers of the optical fiber bundle, the filling material should have a suitable viscosity at the time when it is injected.

Figure 2:
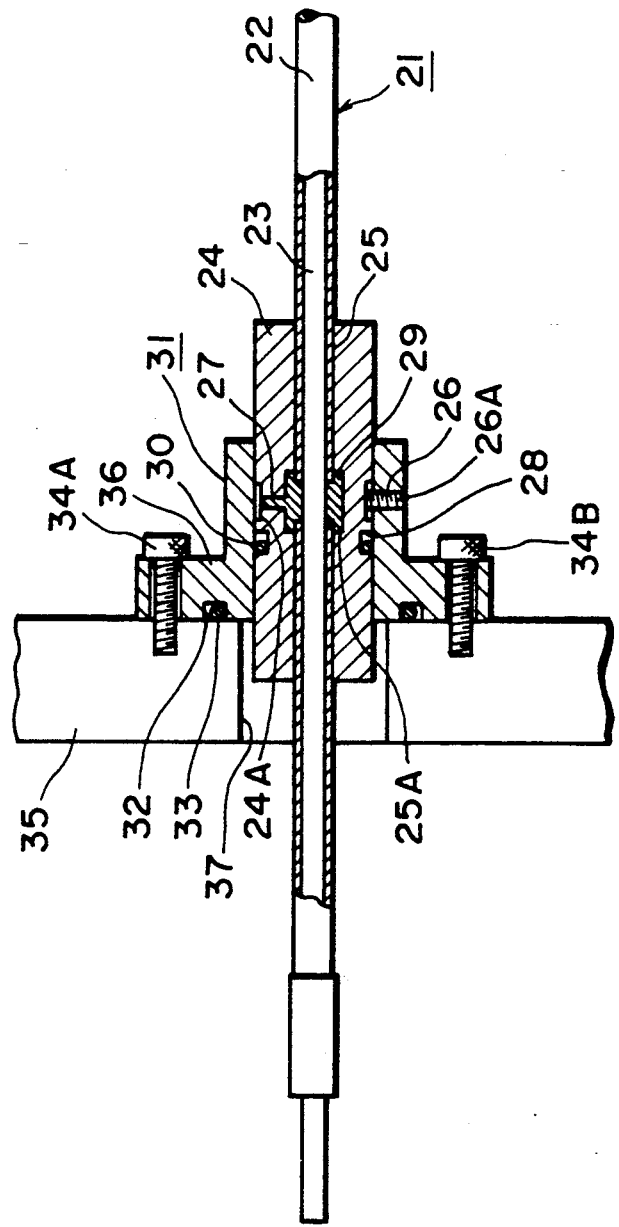
FIG. 2 is a sectional view of a light guide according to another embodiment of the present invention.

Referring now to FIG. 2, a second embodiment of the present invention will be explained.

Similarly, a light guide 21 of this embodiment is usable to introduce a light, emitted by an illumination source outside a closed casing (not shown), into a prealignment observation optical system disposed inside the closed casing. Optical fiber bundle 23 covered by a covering member 22 is fitted into a throughbore 25 formed in a cylindrical member (light guide fixing member) 24 along its lengthwise direction, and it is gas-tightly fixed into a light guide communication bore 37 formed in a wall 35 of the closed casing, by means of a mounting member 31.

The cylindrical member 24 has a recess 25A formed in an inside peripheral surface of a central portion of the throughbore 25, and an introduction hole 27 communicated with the recess 25A for allowing injection therethrough of a filling material 29, similar to that used in the first embodiment and having a suitable viscosity, into the recess 25A. The cylindrical member 24 has a fixing groove 24A formed on its outside circumferential surface portion, at the position of the introduction hole 27, for fixing the cylindrical member to the mounting member 31. Further, adjacent to the fixing groove 24A and at a side facing to the closed casing wall 35, the cylindrical member has a circumferential groove 28 for receiving an O-ring 30. Into the throughbore 25 of the cylindrical member 24, the optical fiber bundle 23 is inserted with the portion of the covering member 22 to be positioned at the recess 25A in the throughbore 25 being peeled off. The filling material 29 is injected through the introduction hole 27. With this filling material 29, the spaces between the covering member 22 and the optical fiber bundle 23 as well as the interstitial clearances among the fibers of the optical fiber bundle 33 can be occupied and blocked.

Denoted at 31 is a mounting member of a cylindrical shape, having a longitudinal length shorter than that of the cylindrical member 24 and having a flange formed at an end portion integrally therewith. The mounting member 31 has a throughbore formed along its length. At a central portion of the mounting member 31, there is formed a fixing hole 26 to be engaged with a fixing screw 26A for fixation of the cylindrical member 24. Further, a groove 32 for receiving an O-ring 33 is formed in a face of the flange 36, facing the closed casing wall 35.

Into the throughbore of this mounting member 31, the cylindrical member 24 having the optical fiber bundle 23 fitted thereinto is inserted, with the O-ring 30 received by the groove 28, so as to align the fixing groove 24A with the fixing bore 26. The cylindrical member is then fixed to the mounting member 31 by thread engagement of the fixing screw 26A with the fixing bore 26. The mounting member 31 is fixed to the closed casing wall 35, at the flange 36, by means of mounting bolts 34A and 34B, with the O-ring 33 being mounted into the groove 32 formed in the flange 36 and with one end portion of the cylindrical member 24 being inserted into the light guide communication bore 37 of the wall 35.

In accordance with the present embodiment, the gas-tightness of the mounting member 31 and the closed casing 35 can be retained by means of the O-ring 33 while the gas-tightness of the mounting member 31 and the cylindrical member 24 can be retained by means of the O-ring 30. Further, the clearance between the optical fiber bundle and the covering member 22 as well as any clearances among the fibers of the optical fiber bundle 23, are all filled with the filling material 29. Thus, substantially the same advantageous effects as of the first embodiment are attainable.

In the embodiments described hereinbefore, a recess is formed in an inside peripheral surface of a throughbore of a cylindrical member (light guide fixing member) and the recess is filled with a filling material injected through an introduction hole. However, since in this portion, a covering member of an optical fiber bundle is peeled off, there is a case where the provision of such recess is not necessary while it may depend on the thickness of the covering member.

While in the foregoing embodiments the invention has been described with reference to examples where it is applied to an X-ray exposure apparatus, the light guide of the present invention is not limited to this but is applicable also to one which uses optical fiber means. An example is a fiber scope.

While the invention has been described with reference to the structures disclosed herein, it is not confined to the details set forth and this application is intended to cover such modifications or changes as may come within the purposes of the improvements or the scope of the following claims.

What is claimed is:

1. A light guide device for guiding light from one side of a wall member to another side thereof, said device comprising:

light guide means having an optical fiber covered with a covering member, with said optical fiber having an uncovered portion not covered by said covering member;

a first member having a throughbore for receiving said light guide means, with said first member being partially inserted into a mounting bore formed in the wall member, wherein said uncovered portion of optical fiber is positioned within said first member, and said first member includes an introduction hole for allowing introduction of a filling material around said uncovered portion of optical fiber; and a second member for fixing said first member to the wall member, wherein said second member is positioned around the mounting bore and secured to the wall member.

2. A device according to claim 1, wherein said first member has a flange and said second member fixed said flange to the wall member.

3. A device according to claim 2, wherein said first member has a recess formed therein for receiving the filling material.

4. A device according to claim 3, further comprising a sealing member provided between said first member and the wall member, wherein said first member has a groove for receiving said sealing member.

5. A device according to claim 1, wherein said first member is inserted rotatably relative to said second member, and a first sealing member is provided between said first and second members, and wherein said second member has a flange which is pressed against the wall member.

6. A device according to claim 5, wherein said first member has a recess formed therein for receiving the filling material.

7. A device according to claim 6, further comprising a second sealing member provided between said second member and the wall member, wherein said second member has a groove for receiving said second sealing member.

8. A device according to claim 7, further comprising screw means for prohibiting relative rotation between said first and second members.

* * * * *

UNITED STATES PATENT AND TRADEMARK OFFICE
CERTIFICATE OF CORRECTION

PATENT NO. : 5,151,967
DATED : September 29, 1992
INVENTOR(S) : Ryuichi Ebinuma

It is certified that error appears in the above-identified patent and that said Letters Patent is hereby corrected as shown below:

COLUMN 5:

Line 3, "33" should read --23--.

COLUMN 6:

Line 29, "fixed" should read --fixes--.

Signed and Sealed this

Sixteenth Day of November, 1993

Attest:

BRUCE LEHMAN

Attesting Officer

Commissioner of Patents and Trademarks